Feb. 16, 1943. C. T. WALTER 2,311,614
WEIGHING AND GRADING APPARATUS
Filed July 24, 1940 3 Sheets-Sheet 1

Charles T. Walter
INVENTOR

BY R. D. Story
ATTORNEY

ATTEST
Wm. C. Meiser

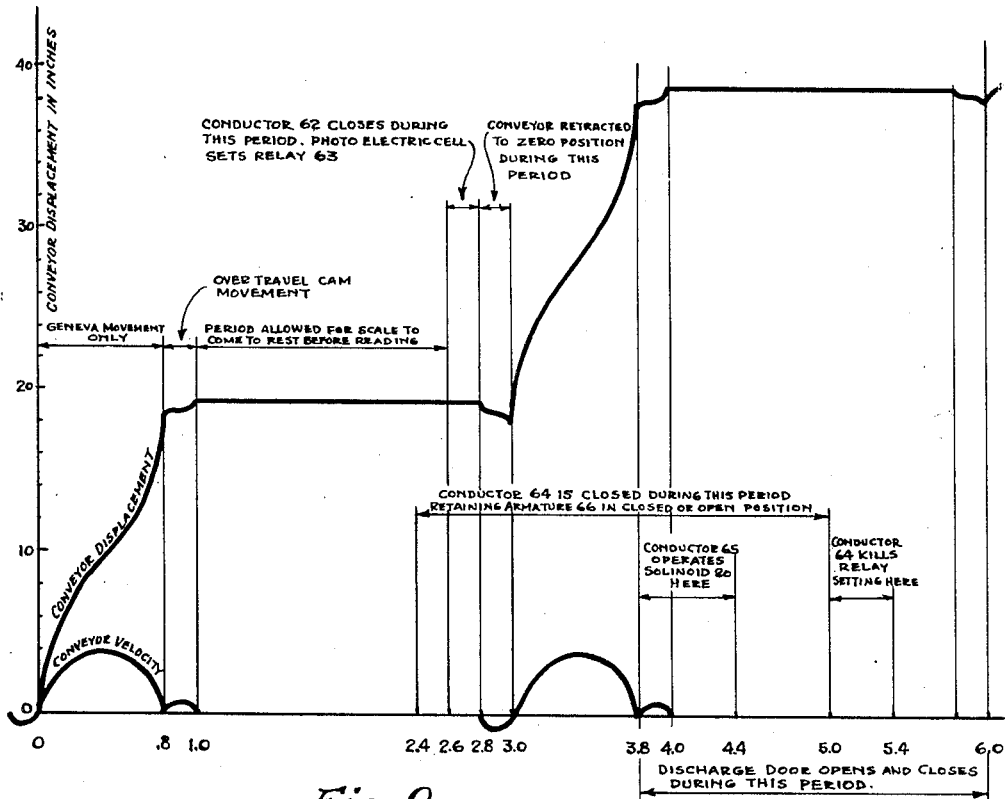
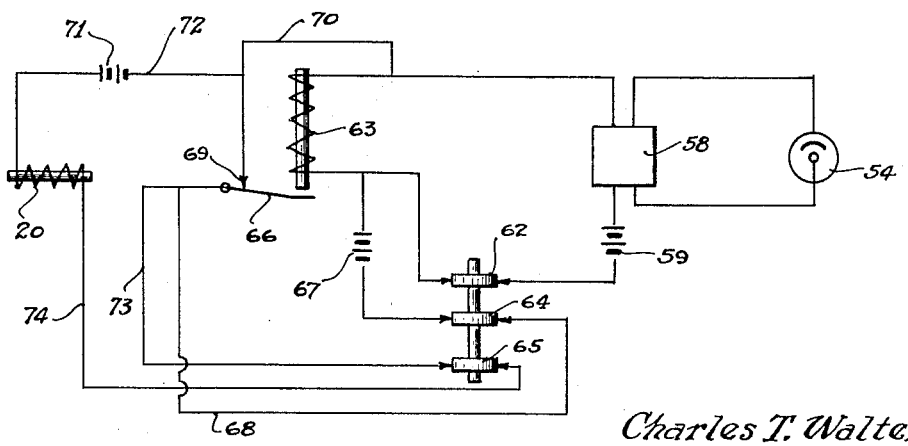

Feb. 16, 1943.    C. T. WALTER    2,311,614
WEIGHING AND GRADING APPARATUS
Filed July 24, 1940    3 Sheets-Sheet 3

ATTEST-
Wm. C. Meiser

Charles T. Walter
INVENTOR
BY R. G. Story
ATTORNEY

Patented Feb. 16, 1943

2,311,614

UNITED STATES PATENT OFFICE 2,311,614

WEIGHING AND GRADING APPARATUS

Charles T. Walter, Chicago, Ill., assignor to Industrial Patents Corporation, Chicago, Ill., a corporation of Delaware Application July 24, 1940, Serial No. 347,249

10 Claims. (Cl. 209—121)

This invention relates to grading apparatus.

One of the objects of this invention is to provide an automatic weighing and grading apparatus.

Another object of this invention is to provide automatic weighing and grading apparatus which is highly reliable and rugged in construction.

Other objects and advantages of this invention will become apparent from the description and claims which follow.

In many industries it is desired to grade various products and classify the products according to weight. In general, products and articles have been graded manually. Manual grading and classification based on weight involves handling of the product and requires considerable time. The operator must first pick up the article, place it on a scale, note the weight of the article, and then transfer the article to a proper conveyor or bin. In grading hams, for example, a bin or truck for a certain weight class of hams may be positioned at some distance from the operator and from the scale and, as a result, the operator throws the ham into the bin from his position. This abusive handling of the ham results in bruising of the meat, and in many cases in tearing a part of the flesh.

In accordance with my invention, a series of articles to be graded is passed over weighing scales and the articles are automatically graded. No manual handling of the products is required, and the articles are not subjected to abusive handling or treatment.

In the drawings, similar reference characters in the several figures are used to indicate similar elements. In the specification, like members in different stations are designated by the same numeral followed by a letter designating the station.

Figure 8 is a wiring diagram of the electrical system controlling the grading apparatus.

Figure 9 is a timing diagram for the grading system.

Figure 1:
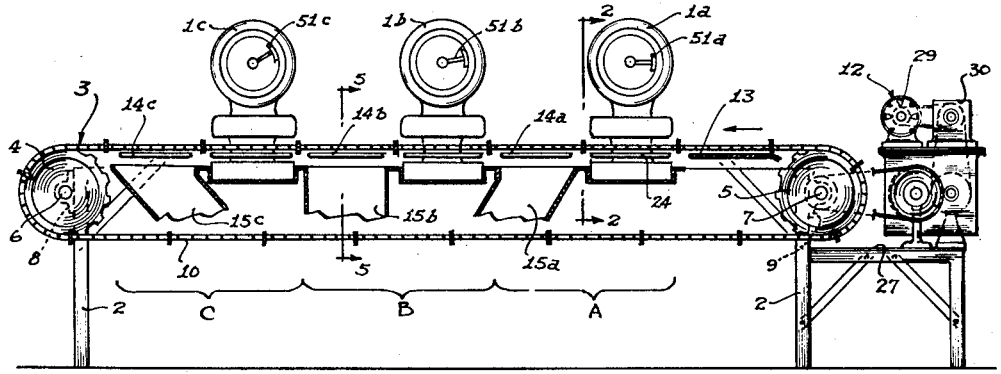
Figure 1 is a front elevational view, partly in section, of the grading apparatus of my invention.
Figure 2:
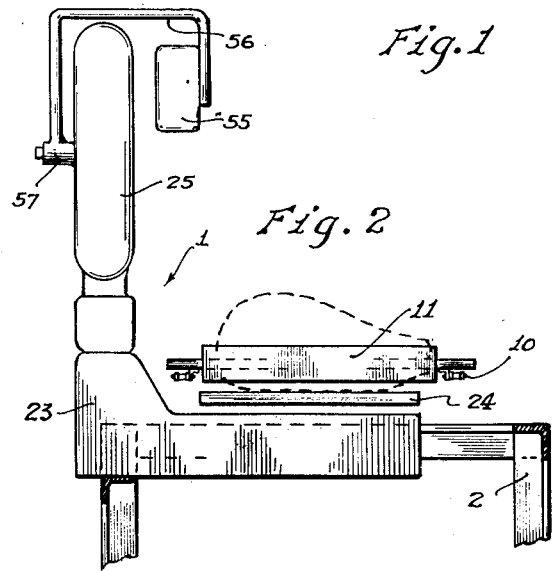
Figure 2 is a sectional view taken on line 2—2 of Figure 1.
Figure 3:
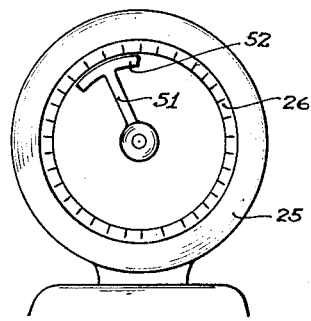
Figure 3 is an enlarged front view of the scale face.

The apparatus consists essentially of an endless conveyor adapted to move the product to be graded over a plurality of scales and cooperating pivotally mounted discharge doors. In the apparatus as illustrated, scales $1a$, $1b$, and $1c$ are rigidly mounted on frame 2. An endless conveyor 3 passes over sprocket wheels 4 and 5, which are mounted on shafts 6 and 7, respectively, which are, in turn, mounted on frame 2 by suitable bearing blocks 8 and 9. The conveyor comprises a pair of endless chains 10 connected by uniformly spaced transverse flight members 11. The spacing between the flight members is dependent upon the nature of the articles to be graded and upon the width of the scale platform. The conveyor is driven through sprocket wheel 5 by means of a suitable driving means 12, which will be described in detail hereinafter.

A fixed stationary platform 13 is mounted on frame 2 between sprocket wheel 5 and scale $1a$. In the apparatus illustrated, three discharge stations are provided, namely, stations A, B, and C. Discharge door $14a$ is pivotally mounted on frame 2 between scales $1a$ and $1b$. A similar discharge door $14b$ is pivotally mounted on frame 2 between scales $1b$ and $1c$. A similar trap door $14c$ is mounted on frame 2 between scale $1c$ and sprocket wheel 4. Chutes $15a$, $15b$, and $15c$ are positioned immediately beneath discharge doors $14a$, $14b$, and $14c$, respectively.

The driving mechanism 12 is adapted to drive the conveyor 3 intermittently, thereby moving the article from stationary platform 13 across the scales and trap doors intermittently, allowing sufficient time for each scale to weigh the article and effect an unlocking of its cooperating discharge door if the article is of the required weight.

Scales $1a$, $1b$, and $1c$ are all of similar construction. The scale consists of a base 23, a scale face housing 25, and a scale platform 24. The scale is provided with a face 26 having the desired weight indicia. A pointer or moving arm 51 is operatively connected to the platform 24. The scales are mounted rigidly on frame 2, the scale platforms being in the common plane with the discharge doors $14a$, $14b$, and $14c$ and with stationary platform 13. The discharge door $14a$ is controlled by the position which is assumed by pointer or arm 51a of scale 1a through means comprising a photoelectric cell and a suitable electrical relay system. The discharge doors 14b and 14c are likewise operated by the position which is assumed by the pointer arms 51b and 51c of scales 1b and 1c, respectively.

The outer portion of pointer 51 is provided with a mirrored surface 52. The mirrored surface embraces an angular distance which is as great as the weight classifications between the scales. For example, if the apparatus is to be employed in grading hams, the scales and discharge doors may be adjusted so that discharge door 14a will be unlocked to permit a ham weighing 14 pounds or over to pass into chute 15a. Trap door 14b and scale 1b may be adjusted to release hams weighing from 12 to 14 pounds into chute 15b. Scale 1c and trap door 14c may be adjusted to pass hams weighing from 10 to 12 pounds into chute 15c. Hams weighing under 10 pounds will be discharged from the end of the moving conveyor. The scale pointers are provided with mirrored surface 52 of a length which will embrace an angle equal to the angle embraced by a differential of 2 pounds.

A photoelectric cell 54 and a light source 53 are conveniently mounted in a casing 55 which is supported by a frame 56 which is, in turn, mounted on a pivot 57 which is concentric with respect to the pointer arm 51.

Briefly, in the operation of the scales, light from source 53 is reflected from mirrored surface 52 and strikes photoelectric cell 54. Light falling upon the photoelectric cell energizes a suitable relay system to release the lock upon the associated trap door. Frame 56 is mounted upon pivot 57 and may be readily adjusted with respect to the scale dial to become operative at any desired weight indicium. The light source 53 is preferably provided with a lens and stop system so as to produce a beam of light or a narrow slit at the plane of the mirrored surface. The light source and photoelectric cell are positioned within housing 55 so that the light incident upon mirrored surface 52 from the light source will be reflected into the photoelectric cell. As is apparent, the precision of the operation depends upon the narrowness and intensity of the beam of light at the mirrored surface.

Figure 5:
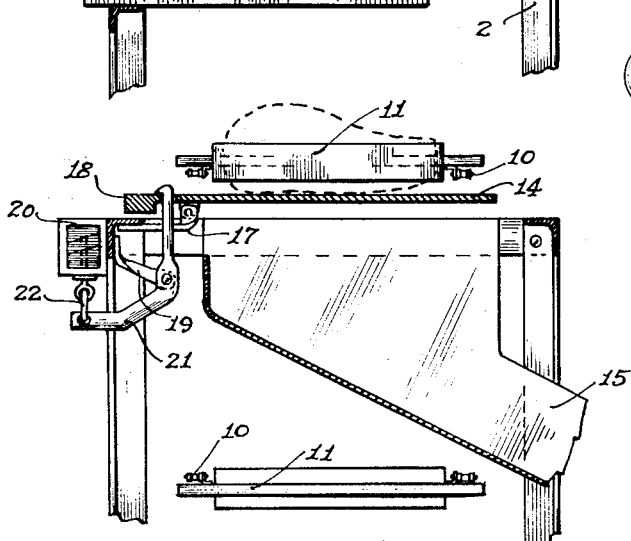
Figure 5 is a sectional view taken on line 5—5 of Figure 1.
Figure 4:
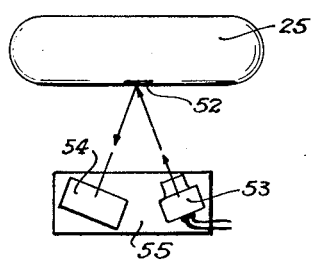
Figure 4 is a diagrammatic illustration showing the relation between the photoelectric unit and the scale face.

The construction of the discharge doors and the relation of the discharge chutes is clearly illustrated in Figure 5. It will be understood that each of the discharge doors 14a, 14b, and 14c and their cooperating chutes are similar and that but one need be described in detail. A pair of brackets 17 are rigidly mounted on frame 2 and are adapted to support pivotally discharge door 14. Discharge door 14 is preferably provided with a counterweight 18 which is adapted to maintain the door in a substantially horizontal position.

A bracket 19 is mounted rigidly on frame 2 and supports pivotally latch member 21. Latch member 21 is operatively connected to solenoid 20 by means of link 22. In the normal position of the solenoid, latch member, and discharge door, the discharge door is maintained in a substantially horizontal position by means of latch member 21 regardless of the weight of any article placed upon door 14. If the article passing to the discharge door is of the desired weight, solenoid 20 is actuated to release latch member 21. As the article passes on to discharge door 14, the weight of the object is sufficient to cause the trap door to pivot on bracket 17, thereby dropping the article into discharge chute 15. As the article passes from the discharge door into the chute, counterweight 18 returns the trap door to a substantially horizontal position. It is obvious that other means may be provided to return the trap door to a substantially horizontal position, for example, a coiled spring, not shown.

Figure 7:
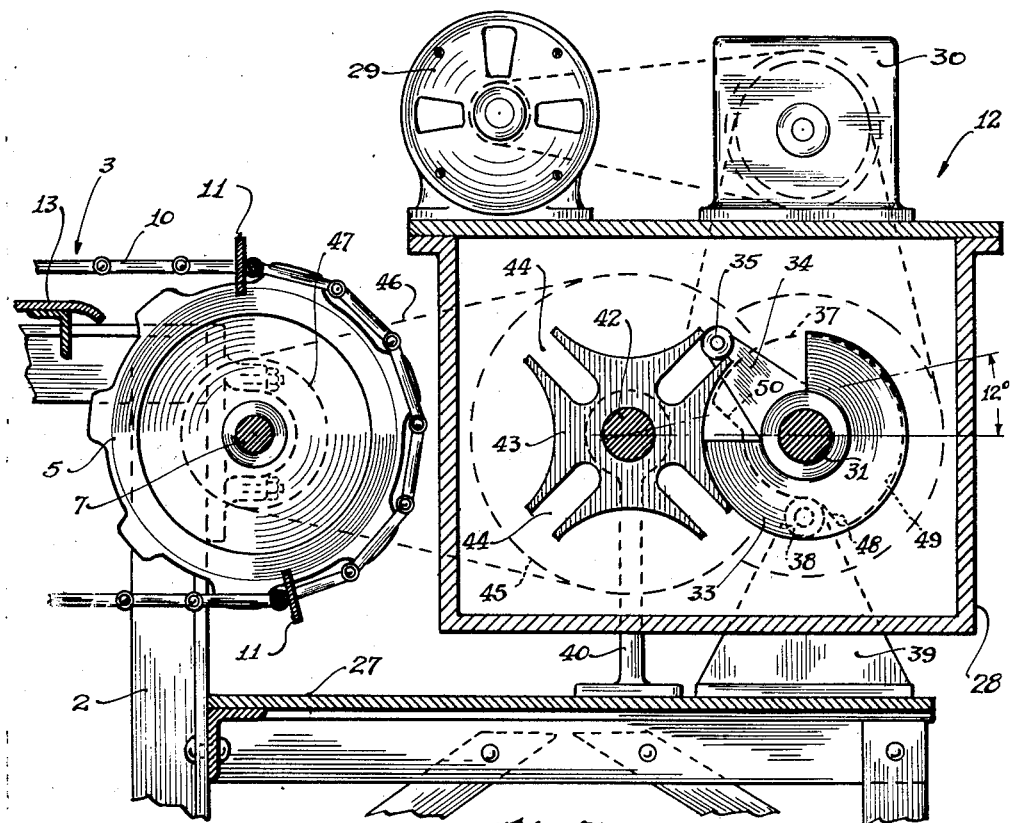
Figure 7 is a vertical sectional view taken on line 7—7 of Figure 6.
Figure 6:
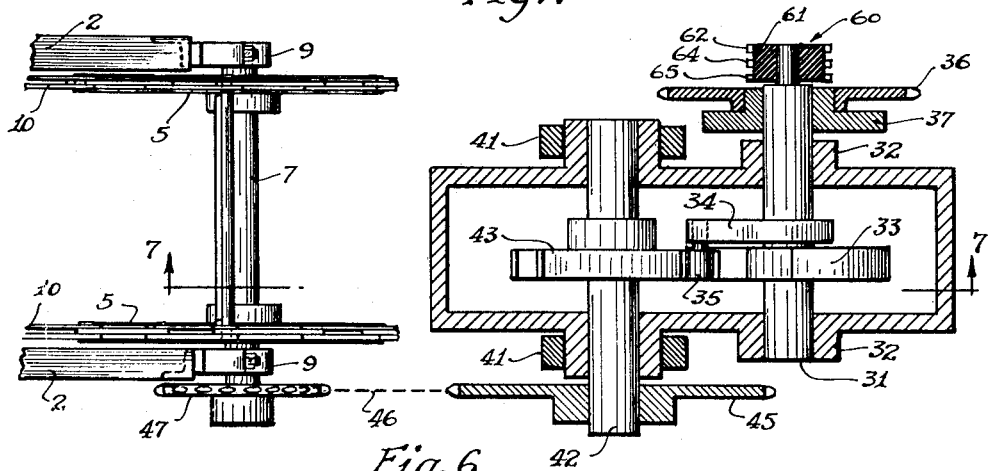
Figure 6 is an enlarged plan view, partly in section, of the driving end of the conveyor system.

The conveyor 3 is preferably driven by means of a Geneva cam mechanism clearly shown in Figures 6 and 7. A platform 27 is mounted on frame 2 and supports a drive housing 28. The mechanism is driven by a source of power, for example, an electric motor 29, through a speed reducer 30. A shaft 31 is journaled in bearings 32, which may be integral with housing 28. The locking disk 33 is mounted rigidly on shaft 31. Arm 34 is secured to the shaft 31 adjacent disk 33, the outer end of arm 34 carrying a driving roller 35. A sprocket wheel 36 and cam 37 are mounted on shaft 31 externally of the housing 28. A commutator 60 is mounted on an extension of shaft 31 and consists of a cylinder of insulating material 61 and suitable electrical conductors 62, 64, and 65. A cam roller 38 is supported in operative relation with cam 37 by means of a bracket 39 which is rigidly secured to platform 27.

The housing 28 is pivotally mounted above the surface of platform 27 by means of standards 40 which are rigidly secured to platform 27 and terminate in bearings 41. A shaft 42 passes through housing 28 concentric with respect to the bearings 41. A Geneva wheel 43 provided with four uniformly spaced radial slots 44 is securely mounted on shaft 42 in operative relation with respect to drive roller 35 and locking disk 33. A sprocket wheel 45 is securely mounted on the shaft 42 externally of casing 28. Sprockets 5 and conveyor 3 are driven from sprocket 45 through a sprocket 47 and belt or chain drive 46. Locking disk 33 prevents rotation of the Geneva wheel 43 except during rotation of the Geneva wheel by means of drive roller 35. A portion of the locking disk is removed to permit rotation of the Geneva wheel during rotation of shaft 31. One complete revolution of sprocket wheel 36 and shaft 31 determines one cycle of operation of the conveyor mechanism. The relationship between the diameters of sprocket wheels 45, 47, and 5 and the number of teeth in these sprocket wheels and the number of pitches in the conveyor chain between adjacent flights must be such that the conveyor 3 moves an amount equal to the distance between adjacent flights on the conveyor chain at each revolution of shaft 31.

The wiring diagram of the electrical apparatus which controls the operation of the discharge doors is illustrated in Figure 8. Light falling upon photoelectric cell 54 creates a flow of current in amplifier 58. Assuming that the circuit is closed through conductor 62 of commutator 60, the current from battery 59 energizes the coil 63, drawing armature 66 to the core. If the circuit through conductor 64 is closed and the circuit through battery 59 is opened, current from battery 67 flows through conductor 64, line 68, armature 66, contact point 69, line 70, and coil 63, thereby maintaining the relay armature 66 in closed position. The circuit through solenoid 20 is then controlled by conductor 65 of the commutator. Assuming that the relay armature 66 is in closed position, current from battery 71 will flow through line 72, contact point 69, armature 66, line 73, conductor 65, line 74, and solenoid 20. Current flowing through the solenoid 20 will release latch member 21 to permit the article which passes to the discharge door to drop into the cooperating chute.

The commutator is so constructed and timed with respect to the travel of the conveyor that the circuit through coil 63 and battery 59 is closed across that part of its circuit which passes through conductor 62 while the article is at rest on the scale platform. During this period the circuit through battery 67 is closed across that part of its circuit which passes through conductor 64. If the article upon the scale platform is of the desired weight, the photoelectric cell sets up currents in the amplifier to operate relay 58 for closing the circuit from battery 59 to coil 63 and current flows through coil 63, closing relay armature 66. The circuit through battery 67 should, therefore, be closed during the period through which conductor 62 is closed so that relay armature 66 will be retained in a closed position if the article upon the scale platform is of the desired weight. As the article on the scale is moved to the trap door position, conductor 62 may open the circuit through battery 59. The circuit through conductor 64 remains closed until the conveyor has moved the articles to their next position. After the conveyor comes to rest and the article has been moved to its next station, conductor 65 closes the circuit through battery 71 and solenoid 20. If the article is of the desired weight, relay armature 66 will be in a closed position and current will flow through the solenoid to open latch member 21. The article will then be dropped from the discharge door into the cooperating chute. The trap door will be returned to a substantially horizontal position by means of the counterweight. The circuit through battery 67 and conductor 64 is opened and the circuit through battery 71 and conductor 65 is also broken by rotation of the commutator. Opening of the circuits resets the armature 66 and the latch member so that they may respond to the action of the next cycle.

To insure accuracy in the weighing of each article it is necessary that the article be placed on the scale platform in such a manner as to prevent contact with the conveyor flights 11. In moving the article upon the scale platform, the article attains a certain velocity and continues to move in a forward direction by inertia until it is stopped by some other force. In the case of hams, for example, the hams after being moved upon the scale platform will generally come to rest against the forward conveyor flight. In order to free the article from contact with the flight, the conveyor is given a further slight forward motion. This motion is obtained by means of cam 37 and cam follower 38, see Figures 6 and 7. Shaft 31 is rotated in a clockwise direction. As shaft 31, arm 34, and cam 37 rotate in a clockwise direction the leading edge 48 of cam 37 rides on cam roller 38. Upon further clockwise rotation the cam 37 causes a slight counterclockwise rotation of housing 28 with respect to the axis of shaft 42. Since Geneva wheel 43 is locked against rotation by disk 33, sprocket wheel 45 likewise rotates in a counterclockwise direction, thereby causing a slight forward motion of the conveyor 3. The outer peripheral edge 49 of cam 37 maintains the housing in angular position as it rides upon roller 38. The trailing edge 50 of cam 37 then rides down on roller 38 to rotate the housing in a clockwise direction and to return it to its initial position.

Continued rotation of shaft 31 causes drive roller 35 to enter a slot 44 in Geneva wheel 43. As the housing reaches its initial position, further rotation of shaft 31 causes a counterclockwise rotation of Geneva wheel 43. Such rotation causes a forward motion of the conveyor 3.

Assume for illustrative purposes that it is desired to grade hams into four classifications, namely, those weighing over 14 pounds, those weighing between 12 and 14 pounds, those weighing between 10 and 12 pounds, and those under 10 pounds. The light source and photoelectric cell carried by frame 56 on each of the scales is set at the desired scale reading. In the case of scale 1a, the frame 56a is adjusted so that the beam of light falls upon the 14 pound indicium. In the case of scale 1b, the frame 56b is adjusted so that the light beam strikes the 12 pound indicium. On scale 1c, the frame 56c is adjusted so that the light beam falls on the 10 pound indicium.

The hams are placed on stationary platform 13 one at a time so that one ham is carried between adjacent flight members 11. The shaft 31 is rotated in a clockwise direction, roller 35 causing the Geneva wheel to rotate through an angle of 90 degrees. The shaft 31 is rotated at such a speed, and the various parts are so proportioned that the conveyor is displaced a desired distance, for example, about 18 inches in 0.8 second, see Figure 9. Cam 37 and cam roller 38 cooperate to tilt housing 28, as described hereinbefore, and cause a slight additional forward displacement of the conveyor during the next 0.2 second. During this period the ham is displaced from stationary platform 13 and conveyed to the scale platform of scale 1a.

During the next 1.8 seconds the conveyor is at rest, and the ham remains stationary upon the platform of scale 1a. During the last 0.2 second of this period commutator 60 by means of conductor 62 closes the circuit through amplifier 58, battery 59, and coil 63. If the ham on the scale weighs 14 pounds or over, the light beam from the light source 53 strikes mirrored surface 52 and is reflected into photoelectric cell 54. Current will then flow through the amplifier 58, battery 59, conductor 62, and coil 63 to raise relay armature 66. During this period the commutator also closes the circuit through battery 67, conductor 64, line 68, armature 66, contact point 69, line 70, and coil 63. At the end of the 0.2 second period during which the conveyor is at rest, commutator 60 opens the circuit through the amplifier 58, battery 59, conductor 62, and coil 63, but armature 66 remains in closed position since coil 63 is energized by the current from battery 67. During the next 0.2 second cam 37 and cam roller 38 lower the housing 28 into its initial position, thereby returning the conveyor to its position at the end of displacement by the Geneva wheel. During this period the circuit through battery 67 remains closed.

Drive roller 44 then enters a slot in the Geneva wheel 43 and again displaces the conveyor the desired distance in 0.8 second. This movement of the conveyor transfers the ham from the platform of scale 1a to discharge door 14a and a second ham from stationary platform 13 to the platform of scale 1a. The commutator then closes the circuit through battery 71, line 72, contact point 69, armature 66, line 73, conductor 65, line 74, and solenoid 20 during the following 0.6 second. At the same time the cam 37 and roller 38 cause a slight forward motion of the conveyor, as described above. The ham on discharge door 14a then falls into chute 15a. After a further period of 0.6 second, the rotation of commutator 60 opens the circuit through conductor 64 and permits relay armature 66 to return to its initial open position. The circuit through conductor 64 is broken for a period of about 0.4 second to permit the relay armature 66 to return to its initial position. At the end of this 0.4 second period, the connection through conductor 64 is again made. The rotation of the commutator then closes the circuit through battery 59, amplifier 58, and coil 63, and if the ham on the platform of scale 1a is under 14 pounds, no mirrored surface will be in a position to reflect the light from light source 53 into photoelectric cell 54. If no light falls on photoelectric cell 54, the coil 63 will not become energized, and the relay armature 66 will not be drawn to the core. Although the circuit through conductor 64 has been made, the relay armature has not been drawn up to close the circuit through contact point 69, and on closing of the circuit through conductor 65, solenoid 20 will not become actuated, and the trap door 14a will remain in a locked position. Further movement of the conveyor will move the ham from the platform of scale 1a onto the trap door 14a. Since the latch member 21 is not tripped by solenoid 20, the ham will remain on the trap door.

Further displacement of the conveyor on the next cycle of operation will move the ham from trap door 14a to the platform of scale 1b. A similar action will occur during the cycle of operation while the ham remains on the platform of scale 1b. If the ham weighs between 12 and 14 pounds, the mirrored surface of the scale pointer will cause an energization of coil 63 and solenoid 20, and when the ham is moved upon discharge door 14b, it will be dropped into chute 15b. If the ham weighs less than 12 pounds, discharge door 15b will remain locked and the ham will eventually pass to the platform of scale 1c. If the ham weighs between 10 and 12 pounds, the discharge door 14c will be unlocked, and the ham when it is moved onto the discharge door 14c will be dropped into chute 15c. If the ham weights less than 10 pounds, discharge door 14c will remain in a locked position, and the ham will be discharged from the end of the conveyor.

The number of scales and trap doors which are provided are dependent upon the variations in the weight of the particular articles to be weighed and by the number of weight classifications desired. The mirrored surface of the scale pointers extends from the reading edge rearwardly through an angle equivalent to the differences in the weight classifications. In the example given above, the mirrored surface extends through an angle equivalent to a differential of 2 pounds. In the operation, light from light source 53 will be reflected into photoelectric cell 54 whenever the pointer presents a mirrored surface at the indicia to which the light beam is adjusted.

The time allowed for the scale to come to rest before the circuit through the amplifier is closed depends upon the individual scale and the scale vibrations before the pointer comes to rest.

The circuit through conductor 64 is opened for a sufficient length of time during each cycle to return the entire electrical system to its initial condition so that the various circuits may respond to the weight of the article being graded.

I claim:

1. A grading device comprising a weighing means having a weighing platform operatively connected with a movable weight indicator, a movable discharge platform arranged to one side of the weighing platform, intermittently operable means adapted to move an article to be graded successively onto the weighing platform and onto the movable discharge platform and photoelectric means associated with the movable weight indicator and adapted upon movement of the movable weight indicator to a predetermined limit upon movement of the article upon the weighing platform to movably operate the movable discharge platform to discharge the article upon timed movement of the article upon the movable discharge platform, the intermittently operable means comprising conveyor means adapted to travel above and over the plane of the weighing platform and the movable discharge platform and having flight members contactably engageable with the article to be graded and a conveyor drive means whereby each cycle of movement of the conveyor means will comprise a relatively quick long movement coming then to a complete stop and followed immediately by a relatively short slow movement before the weighing is done said short slow movement being in the same direction as said long quick movement.

2. A grading device comprising a weighing means having a weighing platform operatively connected with a movable weight indicator, a movable discharge platform arranged to one side of the weighing platform, intermittently operable means adapted to move an article to be graded successively onto the weighing platform and onto the movable discharge platform and photoelectric means associated with the movable weight indicator and adapted upon movement of the movable weight indicator to a predetermined limit upon movement of the article upon the weighing platform to movably operate the movable discharge platform to discharge the article upon timed movement of the article upon the movable discharge platform, the intermittently operable means comprising conveyor means adapted to travel above and over the plane of the weighing platform and the movable discharge platform and having flight members contactably engageable with the article to be graded and a conveyor drive means whereby each cycle of movement of the conveyor means will comprise a relatively quick long movement to move the article rapidly into position by one of said flight members followed by a relatively short slow movement before the weighing is done to cause said article to fall against another of said flight members to destroy the momentum imparted to the article by said rapid movement thereby stopping the article, the relatively long and the relatively short movements of the conveyor means being in the same direction whereby after the article is stopped the conveyor will move forwardly to disengage itself from the arrested article.

3. A grading device comprising a weighing means having a weighing platform operatively connected with a movable weight indicator, a movable discharge platform arranged to one side of the weighing platform, intermittently operable means adapted to move an article to be graded successively onto the weighing platform and onto the movable discharge platform and photoelectric means associated with the movable weight indicator and adapted upon movement of the movable weight indicator to a predetermined limit upon movement of the article upon the weighing platform to movably operate the movable discharge platform to discharge the article upon timed movement of the article upon the movable discharge platform, the intermittently operable means comprising conveyor means adapted to travel above and over the plane of the weighing platform and the movable discharge platform and having flight members contactably engageable with the article to be graded, and a conveyor drive means comprising a pivoted gear housing including positively driven gear mechanism operatively connected with the conveyor means and adapted in each cycle of operation to impart to the conveyor means a relatively long quick movement and means locking the positively driven gear mechanism against further drive movement following the relatively long quick movement of the conveyor means, and means operable following the relatively long quick movement of the conveyor means to pivot the gear housing whereby the locked gear mechanism will impart to the conveyor means a relatively short slow movement.

4. A grading device comprising a weighing means having a weighing platform operatively connected with a movable weight indicator, a movable discharge platform arranged to one side of the weighing platform, intermittently operable means adapted to move an article to be graded successively onto the weighing platform and onto the movable discharge platform and photoelectric means associated with the movable weight indicator and adapted upon movement of the movable weight indicator to a predetermined limit upon movement of the article upon the weighing platform to movably operate the movable discharge platform to discharge the article upon timed movement of the article upon the movable discharge platform, the intermittently operable means comprising conveyor means adapted to travel above and over the plane of the weighing platform and the movable discharge platform and having flight members contactably engageable with the article to be graded, and a conveyor drive means comprising a gear housing, a first shaft and a second shaft mounted through the gear housing, the first shaft being operatively connected in driving relation with the conveyor means, a Geneva wheel pinioned to the first shaft, a Geneva cam and crank pinioned to the second shaft in operative relation with the Geneva wheel, means driving the second shaft, the Geneva wheel being adapted in each cycle of its operation to impart a relatively quick long movement to the conveyor means, means pivotally mounting the gear housing concentrically with the first shaft and means operable following each cycle of movement of the Geneva wheel to pivot the gear housing whereby a relatively slow short movement will be imparted to the conveyor means.

5. A grading device comprising a weighing means having a weighing platform operatively connected with a movable weight indicator, a movable discharge platform arranged to one side of the weighing platform, intermittently operable means adapted to move an article to be graded successively onto the weighing platform and onto the movable discharge platform and photoelectric means associated with the movable weight indicator and adapted upon movement of the movable weight indicator to a predetermined limit upon movement of the article upon the weighing platform to movably operate the movable discharge platform to discharge the article upon timed movement of the article upon the movable discharge platform, the intermittently operable means comprising conveyor means adapted to travel above and over the plane of the weighing platform and the movable discharge platform and having flight members contactably engageable with the article to be graded, and a conveyor drive means comprising a gear housing, a first shaft and a second shaft mounted through the gear housing, the first shaft being operatively connected in driving relation with the conveyor means, a Geneva wheel pinioned to the first shaft, a Geneva cam and crank pinioned to the second shaft in operative relation with the Geneva wheel, means driving the second shaft, the Geneva wheel being adapted in each cycle of its operation to impart a relatively quick long movement to the conveyor means, means pivotally mounting the gear housing concentrically with the first shaft and cam means pinioned to the second shaft and operable following each cycle of movement of the wheel to pivot the gear housing whereby a relatively slow short movement will be imparted to the conveyor means.

6. A grading device comprising a weighing means having a weighing platform operatively connected with a movable weight indicator, a movable discharge platform arranged to one side of the weighing platform, intermittently operable means adapted to move an article to be graded successively onto the weighing platform and onto the movable discharge platform and photoelectric means associated with the movable weight indicator and adapted upon movement of the movable weight indicator to a predetermined limit upon movement of the article upon the weighing platform to movably operate the movable discharge platform to discharge the article upon timed movement of the article upon the movable discharge platform, the intermittently operable means comprising conveyor means adapted to travel above and over the plane of the weighing platform and the movable discharge platform and having flight members contactably engageable with the article to be graded, and a conveyor drive means comprising a gear housing, a first shaft and a second shaft mounted through the gear housing, the first shaft being operatively connected in driving relation with the conveyor means, a Geneva wheel pinioned to the first shaft, a Geneva cam and crank pinioned to the second shaft in operative relation with the Geneva wheel, means driving the second shaft, the Geneva wheel being adapted in each cycle of its operation to impart a relatively quick long movement to the conveyor means, means pivotally mounting the gear housing concentrically with the first shaft and cam means pinioned to the second shaft and operable following each cycle of movement of the wheel to pivot the gear housing whereby a relatively slow short movement will be imparted to the conveyor means, and a cam wheel having a peripheral cam surface operable against a fixed bearing support and adapted following each cycle of movement of the Geneva wheel to pivot the gear housing whereby a relatively slow short movement will be imparted to the conveyor means.

7. In combination with a weighing device, intermittently operable conveying means adapted for the movement of articles to be weighed across the weighing device, and a conveyor drive means comprising a pivoted gear housing including positively driven gear mechanism operatively connected with the conveyor means and adapted in each cycle of operation to impart to the conveyor means a relatively long quick movement and means locking the positively driven gear mechanism against further drive movement following the relatively long quick movement of the conveyor means, and means operable following the relatively long quick movement of the conveyor means to pivot the gear housing whereby the locked gear mechanism will impart to the conveyor means a relatively short slow movement, said conveyor being thus given a motion to carry on article rapidly into position on the scale and to then stop it on the weighing platform thereafter moving out of contact with the article during the weighing period.

8. In combination with a weighing device, intermittently operable conveying means adapted for the movement of articles to be weighed across the weighing device, and a conveyor drive means comprising a gear housing, a first shaft and a second shaft mounted through the gear housing, the first shaft being operatively connected in driving relation with the conveyor means, a Geneva wheel pinioned to the first shaft, a Geneva cam and crank pinioned to the second shaft in operative relation with the Geneva wheel, means driving the second shaft, the Geneva wheel being adapted in each cycle of its operation to impart a relatively quick long movement to the conveyor means, means pivotally mounting the gear housing concentrically with the first shaft and means operable following each cycle of movement of the Geneva wheel to pivot the gear housing whereby a relatively slow short movement will be imparted to the conveyor means, said conveyor being thus given a motion to carry an article rapidly into position on the scale and to then stop it on the weighing platform thereafter moving out of contact with the article during the weighing period.

9. In combination with a weighing device, intermittently operable conveying means adapted for the movement of articles to be weighed across the weighing device, and a conveyor drive means comprising a gear housing, a first shaft and a second shaft mounted through the gear housing, the first shaft being operatively connected in driving relation with the conveyor means, a Geneva wheel pinioned to the first shaft, a Geneva cam and crank pinioned to the second shaft in operative relation with the Geneva wheel, means driving the second shaft, the Geneva wheel being adapted in each cycle of its operation to impart a relatively quick long movement to the conveyor means, means pivotally mounting the gear housing concentrically with the first shaft and cam means pinioned to the second shaft and operable following each cycle of movement of the wheel to pivot the gear housing whereby a relatively slow short movement will be imparted to the conveyor means, said conveyor being thus given a motion to carry an article rapidly into position on the scale and to then stop it on the weighing platform thereafter moving out of contact with the article during the weighing period.

10. In combination with a weighing device, intermittently operable conveying means adapted for the movement of articles to be weighed across the weighing device, and a conveyor drive means comprising a pivoted gear housing including positively driven gear mechanism operatively connected with the conveyor means and adapted in each cycle of operation to impart to the conveyor means a relatively long quick movement and means locking the positively driven gear mechanism against further drive movement following the relatively long quick movement of the conveyor means, and means operable following the relatively long quick movement of the conveyor means to pivot the gear housing whereby the locked gear mechanism will impart to the conveyor means a relatively short slow movement, and a cam wheel having a peripheral cam surface operable against a fixed bearing support and adapted following each cycle of movement of the Geneva wheel to pivot the gear housing whereby a relatively slow short movement will be imparted to the conveyor means, said conveyor being thus given a motion to carry an article rapidly into position on the scale and to then stop it on the weighing platform thereafter moving out of contact with the article during the weighing period.

CHARLES T. WALTER.

CERTIFICATE OF CORRECTION.

Patent No. 2,311,614. February 16, 1943.

CHARLES T. WALTER.

It is hereby certified that error appears in the printed specification of the above numbered patent requiring correction as follows: Page 2, second column, line 19, for "srocket" read --sprocket--; page 3, first column, line 8, for the words "across that part of its circuit which passes" read --through that part of the circuit--; line 9, for "through" read --including--; page 4, first column, line 48, for "weights" read --weighs--; page 6, first column, line 18, for "on" read --an--; and that the said Letters Patent should be read with this correction therein that the same may conform to the record of the case in the Patent Office.

Signed and sealed this 6th day of April, A. D. 1943.

Henry Van Arsdale,
Acting Commissioner of Patents.

(Seal)